United States Patent Office 2,785,210
Patented Mar. 12, 1957

2,785,210

PROCESS FOR PREPARING AROMATIC HYDROCARBONS

Arie Schmetterling, Frankfurt am Main, and Hans Krekeler, Konigstein (Taunus), Germany, assignors to Farbwerke Hoechst Aktiengesellschaft vormals Meister Lucius & Brüning, Frankfurt am Main, Germany, a corporation of Germany No Drawing. Application August 24, 1954, Serial No. 451,983

Claims priority, application Germany August 29, 1953

5 Claims. (Cl. 260—673.5)

The present invention relates to a process for preparing aromatic hydrocarbons.

It is known that mixtures of aromatic substances containing para-xylene are obtained by the aromatization (dehydrocyclization) of aliphatic hydrocarbons containing 8 carbon atoms. From n-octane, for example, a mixture is obtained containing 85 percent of ortho-xylene, 2 percent of meta-xylene, 3 percent of para-xylene and 10 percent of ethyl-benzene. 3-methylheptane or 2-ethylhexene-(1) yields mixtures of ortho- and para-xylene and also ethyl-benzene. 2.5-dimethylhexane yields 36 percent of xylene.

For the aforesaid processes there are used chromium oxide, chromium oxide/aluminium oxide or platinized carbon catalysts. It is also known that 2,2,4-trimethylpentane can be aromatized at about 550° C. in the presence of a chromium oxide/aluminium oxide catalyst or a molybdenum oxide aluminium oxide catalyst. In the one case only ortho-xylene is obtained and in the other a mixture consisting chiefly of ortho- and para-xylene and a small amount of meta-xylene, the yield of the mixture amounting to about 10 percent.

Now we have found that aromatic hydrocarbons, especially para-xylene, can be obtained by passing 2.2.4-trimethylpentane vapor at a raised temperature over a catalyst comprising chromium oxide, potassium oxide, cerium oxide and γ-aluminium oxide. If desired, the reaction may be carried out in the presence of carrier gases consisting advantageously of hydrogen and aliphatic hydrocarbons of low molecular weight containing at most 4 carbon atoms, especially isobutylene.

It is surprising and could not be foreseen that by the process of the invention aromatic hydrocarbons, especially para-xylene, which is very important in industry, could be obtained in a good yield. The proportions of the constituents of the catalyst may vary within the ranges of 5–40 percent of chromium oxide, 1–10 percent of potassium oxide, 0.5–5 percent of cerium oxide and 93.5–45 percent of γ-aluminium oxide, the percentages being by weight. An especially advantageous composition is 12.1 parts of chromium oxide, 1.7 parts of potassium oxide, 1.5 parts of cerium oxide and 84.7 parts of γ-aluminium oxide, the parts also being by weight.

For carrying out the process of the invention the method of preparing the catalyst is also important. The components may be precipitated together or mixed with one another, but it is more advantageous to absorb the active components on the surface of the contact acting as carrier. A suitable contact is obtained by precipitating aluminium hydroxide from an aluminium nitrate solution with an equivalent quantity of an ammonia solution of 15 percent strength, and heating the aluminium hydroxide at 750° C. for 5 hours to convert it into γ-aluminium oxide. The resulting mass is broken up into small pieces and the particle grains of a diameter of 3–5 millimetres are sieved out. A solution of chromic acid, potassium nitrate and cerous nitrate is added dropwise to the particles so that the whole of the solution is absorbed, and while shaking to ensure uniform distribution 150 grams of the granular aluminium oxide completely absorb a solution of 31.5 grams of chromic acid, 4.5 grams of potassium nitrate and 1.5 grams of cerous nitrate in 110 cc. of water. After drying the particles for 3 hours at 550° C. and reduction in a current of hydrogen, the catalyst is ready for use.

This catalyst has a life of more than 100 hours without regeneration. The yield of para-xylene after 100 hours amounts to 95% of the yield obtained after 25 hours. After regeneration (carried out by blowing air over the catalyst at 550° C.) the catalyst regains its initial activity.

In the process of the invention the yield of para-xylene and other aromatic hydrocarbons depends on the temperature and the contact time, that is the period during which the trimethylpentane remains in the reaction zone. The higher the temperature the greater is the degree of aromatization and also the amount of splitting, so that less starting material can be recovered and consequently a smaller yield is obtained than when working at a lower temperature.

The influence of the contact time on the reaction is analogous to that of the temperature. When the contact time is increased without changing the temperature, the degree of aromatization as well as that of splitting rises. Since the splitting increases at a greater rate, the yield of aromatic hydrocarbons and para-xylene is lower. If the contact time is shortened and the temperature raised in such a manner that both factors just compensate each other with respect to splitting, an increased aromatizing effect is obtained. However, the time during which cyclization, isomerization and aromatization by dehydrogenation are to take place, must not be shortened to such an extent that insufficient dehydrogenation occurs. The process can be carried out at temperatures within the range of 450° C. to 650° C. and contact times of 0.1 to 60 seconds, and advantageously temperatures of 475° C. to 550° C. and contact times of 1 to 12 seconds.

A part of the 2,2,4-trimethylpentane used is split into gaseous products during the reaction. Up to 90 percent of these hydrocarbons of low molecular weight consist of isobutylene, which can be dimerized to 2,4,4-trimethylpentene and used again after it has been hydrogenated to trimethylpentane.

As carrier gases there may be used nitrogen, hydrogen or an aliphatic hydrocarbon of low molecular weight having at most 4 carbon atoms, or a mixture of nitrogen or hydrogen with such a hydrocarbon. As compared with other carrier gases, for example, nitrogen, hydrogen has the advantage that it considerably reduces the deposition of carbon and condensation products of high molecular weight on the catalyst, thus prolonging the life of the latter. It is of special advantage to use as carrier gas a mixture of hydrogen and isobutylene, since splitting of the starting material to isobutylene is considerably reduced due to the presence of isobutylene. However, these hydrocarbons can be used as carrier gases only at temperatures below 550° C.

The process of the invention may be carried out continuously and, if desired, in a cyclic manner.

The use of catalysts consisting of aluminium oxide, chromium oxide, potassium oxide and cerium oxide has already been described in the literature, but it is expressly stated that as starting materials for this reaction there are used only hydrocarbons containing at least 6 carbon atoms in an open chain. It could, therefore, not be expected that 2,2,4-trimethylpentane would yield aromatic hydrocarbons, and in particular para-xylene. Above all it could not be expected that especially large quantities of para-xylene would be obtained by the use of the above described catalysts consisting of chromium oxide, potassium oxide, cerium oxide and aluminium oxide.

The following examples serve to illustrate the invention, but they are not intended to limit it thereto:

*Example 1*

103.0 grams of 2,2,4-trimethylpentane vapor are passed at 525° C. and at the rate of 34.3 grams per hour over 69 cc. of a catalyst consisting of chromium oxide, potassium oxide, cerium oxide, γ-aluminium oxide (12.1, 1.7, 1.5 and 84.7 parts by weight respectively). 8.2 litres of a mixture of equal parts by volume of hydrogen and isobutylene are passed per hour as carrier gas through the furnace. The contact time is thus 6.2 seconds. 83.7 grams (81.3 percent of the batch) of liquid reaction product are obtained. It contains 10.5 grams of para-xylene besides 0.1 gram of meta-xylene and 0.1 gram of ortho-xylene. 73.0 grams of the starting material have not reacted. The amount of the starting material which undergoes conversion is 30.0 grams, and the yield of para-xylene calculated on this conversion, amounts to 35.0 percent, which corresponds to 37.6 percent of the theoretical yield. During the reaction 18.1 grams of gas are formed, 16.2 grams of which are isobutylene. After dimerization, 13.8 grams of 2,4,4-trimethylpentene can be hydrogenated and reacted again, whereby the yield of para-xylene is raised to 65.0 percent by weight of the extent of conversion (70.0 percent of the theoretical yield).

*Example 2*

2,2,4-trimethylpentane vapor is passed at 480° C. and with a contact time of 26.4 seconds over the catalyst described in Example 1. A liquid product is obtained in a yield of 67.8 percent calculated on the weight of the starting material. The product consists of 7.0 percent of aromatic substances (para-xylene of 98 percent strength) and 93 percent of non-reacted trimethylpentane.

*Example 3*

2,2,4-trimethylpentane vapor is passed at 575° C. and with a contact time of 20.1 seconds over the catalyst described in Example 1. A liquid product is obtained in a yield of 18.9 percent calculated on the weight of the starting material used. It contains 42.0 percent of aromatic substances (para-xylene of 86.1 percent strength).

*Example 4*

2,2,4-trimethylpentane vapor is passed at 525° C. and with a contact time of 59.5 seconds over the catalyst described in Example 1. A liquid product is obtained in a yield of 11.2 percent calculated on the weight of the starting material used. It contains 67.1 percent of aromatic substances (para-xylene of 77.0 percent strength).

*Example 5*

2,2,4-trimethylpentane vapor is passed at 525° C. with a contact time of 5.0 seconds over the catalyst described in Example 1. A liquid product is obtained in a yield of 67.0 percent. It contains 12.9 percent of aromatic substances (para-xylene of 97 percent strength).

We claim:

1. A process for preparing aromatic hydrocarbons by conducting 2,2,4-trimethylpentane vapors over solid catalysts at elevated temperatures which process comprises carrying out the reaction in the presence of a catalyst comprising 5 to 40% of chromium oxide, 1 to 10% of potassium oxide, 0.5 to 5% of cerium oxide and 93.5 to 45% of γ-aluminium oxide in the presence of carrier gases at temperatures between 450° C. and 650° C. for a contact time of between 0.1 and 60 seconds.

2. A process for preparing aromatic hydrocarbons by conducting 2,2,4-trimethylpentane vapors over solid catalysts at elevated temperatures which process comprises carrying out the reaction in the presence of a catalyst comprising 5 to 40% of chromium oxide, 1 to 10% of potassium oxide, 0.5 to 5% of cerium oxide, and 93.5 to 45% of γ-aluminium oxide in the presence of a mixture of hydrogen and lower aliphatic hydrocarbons having at most 4 carbon atoms, containing iso-butylene at temperatures between 475° C. and 550° C. for a contact time of between 1 and 12 seconds.

3. A process for preparing aromatic hydrocarbons by conducting 2,2,4-trimethylpentane vapors over solid catalysts at elevated temperatures which process comprises carrying out the reaction in the presence of a catalyst comprising 5 to 40% of chromium oxide, 1 to 10% of potassium oxide, 0.5 to 5% of cerium oxide and 93.5 to 45% of γ-aluminium oxide in the presence of hydrogen at temperatures between 450° C. and 650° C. for a contact time of between 0.1 and 60 seconds.

4. A process for preparing aromatic hydrocarbons by conducting 2,2,4-trimethylpentane vapors over solid catalysts at elevated temperatures which process comprises carrying out the reaction in the presence of a catalyst comprising 5 to 40% of chromium oxide, 1 to 10% of potassium oxide, 0.5 to 5% of cerium oxide and 93.5 to 45% of γ-aluminium oxide in the presence of isobutylene at temperatures between 475° C and 550° C. for a contact time of between 1 and 12 seconds.

5. A process for preparing aromatic hydrocarbons by conducting 2,2,4-trimethylpentane vapors over solid catalysts at elevated temperatures which process comprises carrying out the reaction in the presence of a catalyst comprising 5 to 40% of chromium oxide, 1 to 10% of potassium oxide, 0.5 to 5% of cerium oxide and 93.5 to 45% of γ-aluminium oxide, the aluminium oxide having the oxides of chromium, potassium and cerium absorbed thereby, in the presence of a carrier gas selected from the group consisting of hydrogen, isobutylene and mixtures thereof at temperatures between 450° C. and 650° C. for a contact time of between 0.1 and 60 seconds.

References Cited in the file of this patent

UNITED STATES PATENTS 2,337,190    Greensfelder _____ Dec. 21, 1947

OTHER REFERENCES

Herrington et al.: Chem. Abs., vol. 40 (1946), p. 1796.
Plate et al.: Chem. Abs., vol. 45 (1951), p. 7032c.